United States Patent [19]

Prochnow

[11] 4,208,113

[45] Jun. 17, 1980

[54] PHOTOGRAPHIC CAMERA

[75] Inventor: Claus Prochnow, Brunswick, Fed. Rep. of Germany

[73] Assignee: Rollei-Werke Franke & Heidecke GmbH, Brunswick, Fed. Rep. of Germany

[21] Appl. No.: 50,112

[22] Filed: Jun. 19, 1979

[30] Foreign Application Priority Data

Jun. 30, 1978 [DE] Fed. Rep. of Germany ....... 2828779

[51] Int. Cl.² .................. G03B 17/38; G03B 29/00
[52] U.S. Cl. .................................. 354/82; 354/266
[58] Field of Search ............... 354/266, 269, 293, 81, 354/82; 352/243

[56] References Cited

U.S. PATENT DOCUMENTS

| 2,275,644 | 3/1942 | Olmstead | 354/82 X |
| 2,961,937 | 11/1960 | Karpf | 354/82 |

Primary Examiner—John Gonzales
Attorney, Agent, or Firm—Michael J. Striker

[57] ABSTRACT

A camera has a housing and a T-shaped handgrip turnably mounted on a side wall of the housing. A shutter release element is mounted in the housing. A trigger button is mounted in the handgrip. A coupling is interposed between the button and the shutter release element and is composed of two slidable pins extending normal to each other and having cooperating cam faces so arranged that when one pin moves towards the other in response to depressing of the trigger button, it causes the other pin to slide toward and actuate the shutter release element.

27 Claims, 4 Drawing Figures

PHOTOGRAPHIC CAMERA

BACKGROUND OF THE INVENTION

The present invention relates to a photographic camera in general.

More particularly, the invention relates to a photographic camera, especially but not exclusively a still camera, having a handgrip which is pivotable with respect to the camera housing and can be detached therefrom.

It is already known to provide cameras which detachable handgrips which, moreover, can be turned with reference to the camera housing. The purpose of this is to facilitate the operation of the camera by making the handgrip turnable about an axis which extends transverse (usually in normal) to the optical axis of the camera lens. Because of this the camera can be more conveniently operated while being held in either the left hand or the right hand of a user, and the arrangement also has further advantages in terms of camera operation. To permit one-hand operation, that is to free the second hand of the user completely for performing various settings on the camera, such as the distance setting and the setting of the exposure parameters, it is advantageous if the handle is provided with a manually operable trigger which controls the shutter release of the camera, so that one hand not only holds the camera via the handle but also operates the camera mechanism.

A camera of this type is known wherein the handgrip is mounted laterally on the camera housing and provided with a substantially axially extending bore through which a Bowden-type wire release (commercially available) can be pulled so that the pushbutton of the release projects beyond the free end of the handgrip and can be depressed by the thumb or index finger of the user. The cable part of the release projects from the handgrip and its free end carries a threaded nipple which must be screwed into the wire-release connector of the camera. This arrangement has the advantage that it permits the handgrip and camera to be freely turned with reference to one another to different positions, but nevertheless assures that irrespective of the particular position of camera and handgrip relative to one another the shutter release can always be operated by use of the wire release. It is, however, a distinct disadvantage that the installation and removal of the handgrip are very time consuming. It is first necessary, when installing the handgrip, to insert the wire release into the grip, thereupon to connect the grip with the camera housing, and finally to screw the nipple of the wire release into the appropriate connector of the housing. Also, the cable of the wire release hangs freely between the handgrip and the camera and a user may become entangled in it.

SUMMARY OF THE INVENTION

It is therefore an object of the present invention to provide an improved camera which is not subject to the prior-art disadvantages.

A more specific object of the invention is to provide such an improved camera, particularly but not exclusively a still camera, wherein it is assured that when the handgrip is connected to or removed from the camera housing, the shutter release element and the trigger element are automatically disengaged, respectively re-engaged with one another. Thus, a simple mounting of the handgrip on the housing automatically assures that the camera is ready for operation without requiring any further measures.

Another object is to provide such a camera wherein a motion-transmitting coupling between the trigger button in the handgrip and the shutter release element in the camera housing is simple and highly reliable in its operation.

Pursuant to these objects, and still further objects which will become apparent hereafter, one aspect of the invention resides in a camera, particularly in a still camera. Briefly stated, such as a camera may comprise a housing provided with a lens having an optical axis and a shutter release element in the housing. A handgrip is mounted on the housing turnable about a pivot axis transverse to the optical axis and includes one part which extends along the pivot axis and another part extending in a direction transverse to the pivot axis. A trigger button is mounted in the other part of the handgrip for sliding movement in the aforementioned direction, and means are provided for coupling the trigger button with the shutter release element to actuate the latter in response to the sliding movement of the trigger button. Such means may comprise a first pin which is slidable in the one part lengthwise of the pivot axis from a rest position to an operating position in which it operates the shutter release element, a second pin which is slidable in the other part together with the button in the direction from a starting position towards and away from the first pin, and cooperating portions on the two pins which are engageable with one another in response to sliding of the second pin towards the first pin and which operate to impart to the first pin upon such engagement a sliding movement to its operating position in which it operates the shutter release element in the camera housing.

The construction just outlined assures a compact and inexpensive handgrip arrangement in which the mere assembling of the handgrip to the camera housing automatically makes the shutter release element ready for use. Despite the integration of the trigger button in the handgrip the free ability of the handgrip to be pivoted relative to the housing is completely maintained and the shutter release element can be operated by the trigger button in any relative position of housing and handgrip. The integration of the trigger button in the handgrip as a non-disconnectable part of the same makes it possible to locate the trigger button on the handgrip in any position found to be most suitable for convenient operation by the user and to be least tiring to the user. This greatly contributes to the ability of the user to hold the camera steady over long periods of time. In addition, the complete integration of the trigger button in the handgrip eliminates all previously necessary Bowden cables or other linkages which might cause problems.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Since the three embodiments in FIGS. 1–4 are largely similar, they will be discussed jointly and only the differences will be discussed separately hereafter. Like numerals identify like elements.

The camera in FIGS. 1–4 is illustrated as a still camera. It is to be understood, however, that the invention applies equally well to a motion-picture camera although a specific illustration thereof has not been provided.

Figure 1:
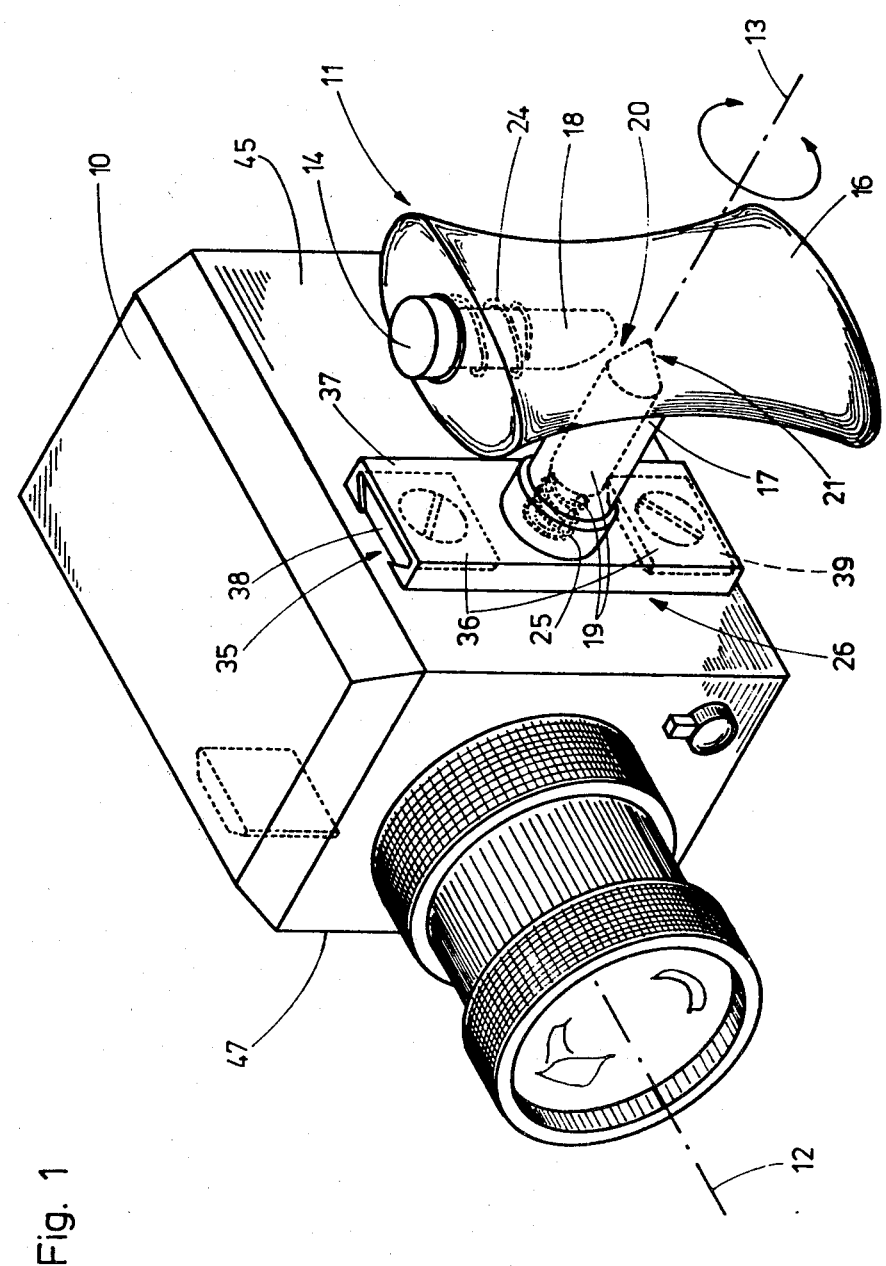
FIG. 1 is a perspective view illustrating a camera according to one embodiment of the invention.
Figure 2:
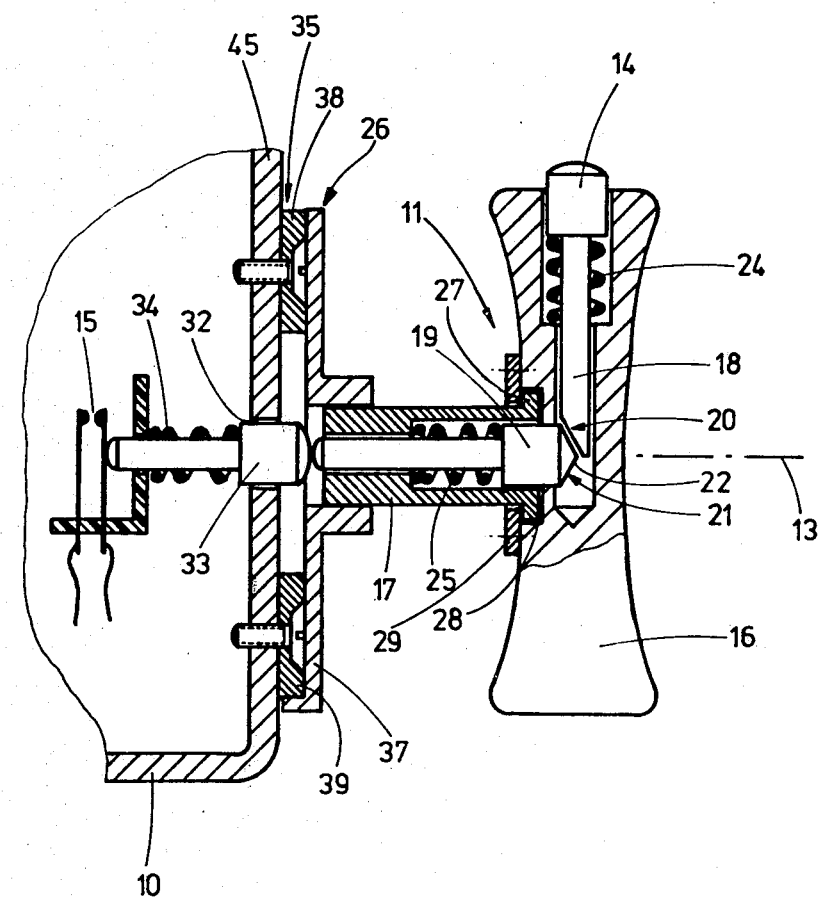
FIG. 2 is a partly sectioned fragmentary detail view showing a detail of the camera in FIG. 1.
Figure 3:
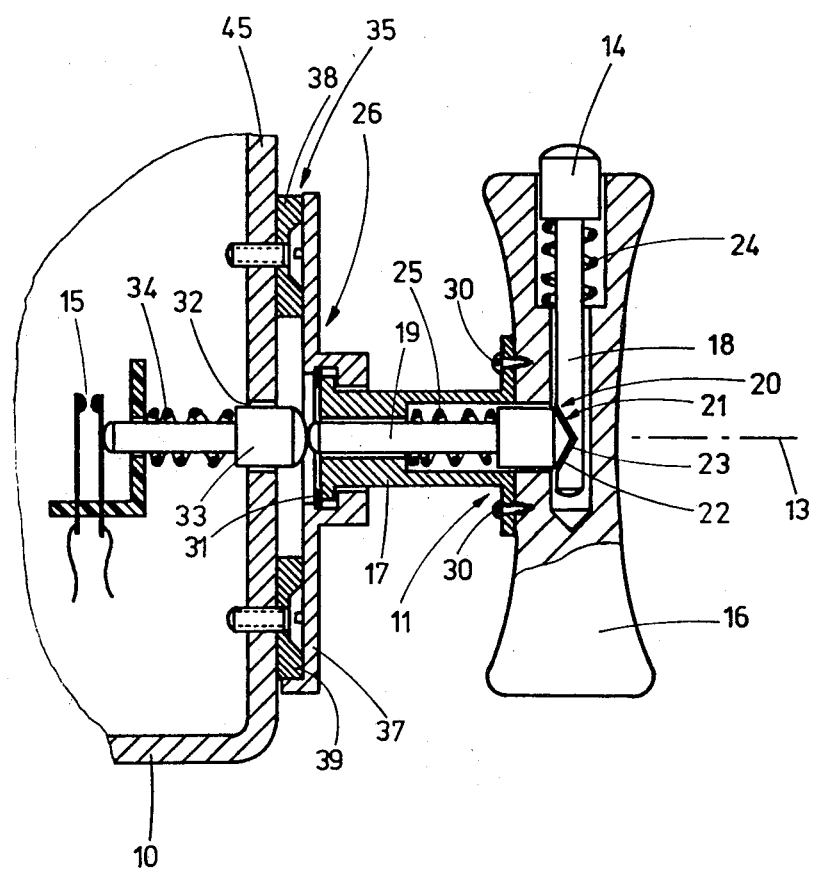
FIG. 3 is a view similar to the one in FIG. 2, but illustrating a further embodiment of the invention.

The illustrated camera in FIGS. 1–4 has a housing 10 and a handgrip 11 which is detachably mounted on the housing 10. The handgrip 11 is pivotable about a pivot axis 13 that extends substantially at right angles to the optical axis 12 of the camera lens. The camera has, as do all cameras, a shutter (not separately illustrated because it is known per se) and for the shutter it has a shutter release element which may, as illustrated in FIGS. 2 and 3, be an electrical switch 15. The shutter release is activated by a trigger button 14 which in the illustrated embodiment is integrated in the handgrip 11, in such a manner as to be non-detachable from it in the normal course of events, i.e. so that it cannot become lost or does not require to be disengaged from the handgrip as does the wire release in the prior-art camera described earlier. Depressing of the button 14 causes the shutter release element 15 to be operated and thus to operate the shutter.

If the shutter release element 15 is a switch as shown by way of example, then the closing of the switch in turn closes a circuit which either energizes or deenergizes a holding magnet for the shutter and thus permits the shutter to operate. If the camera is purely mechanical and the shutter release element is therefore of a mechanical variety, then it may be constructed as a blocking pawl which holds the shutter in its ready-to-operate position, and which is retracted when the button 14 is depressed so as to allow the shutter to operate.

The handgrip 11 is composed essentially of two parts, namely a holding member 17 extending along the pivot axis 13 and a gripping member 16 which extends transverse to the pivot axis 13. The trigger button 14 is mounted in the gripping member 16 and when depressed will shift inwardly of the same, substantially at right angles to the pivot axis 13. A coupling is interposed between the button 14 and the shutter release element 15 so as to transmit motion to the latter when the button is depressed. This coupling is composed of two coupling pins 18 and 19, the pin 18 being located in the gripping part 16 so that it will slide transverse to the pivot axis 13 when the button 14 is depressed. The pin 18 may but need not be of one piece with the button 14, although this is currently preferred. The second pin is identified with reference numeral 19 and is slidably accommodated in the part 17 of the handgrip 11, being slidable lengthwise of the pivot axis 13. Its inner end (the one closer to the camera housing 10) may act directly or else indirectly upon the shutter release element 15, whereas its outer end extends into the path of movement of the pin 18. One or both of the pins is provided with a coupling face 21 which converts a sliding movement of the pin 18 in direction towards the pivot axis 13 into a corresponding sliding movement of the pin 19 in direction inwardly of the camera housing 10.

In FIG. 1 it will be seen that the coupling face 21 is configured as a conical surface 22 the axis of which is aligned with the pivot axis 13. As FIGS. 1 and 2 show, the leading end of the pin 18 is provided with an inclined surface or facet 20 which engages the surface 22 when the pin 18 moves towards the pivot axis 13 in response to depressing of the button 14, pushing the surface 22 and thus the pin 19 out of the way and towards the camera housing 10.

The embodiment in FIG. 3 differs from the one in FIGS. 1 and 2 only in that the pin 18 is provided not with the facet 20 but instead with a conical recess bounded by a correspondingly conical surface 23 the axis of which is aligned with the pivot axis 13 as long as the pushbutton 18 is not depressed. In that case the outer end of the pin 19 may be provided with a facet corresponding to the facet 20 in FIG. 2 or else it may, of course, be provided with a conical end face as is shown in FIG. 3 and which corresponds to the one shown in FIG. 2.

The pins 18 and 19 are each biased to a rest position by a respective helical spring 24 and 25 surrounding the respective pins as shown. The pin 18 or the button 14 will of course be provided with a suitable abutment (not shown, because conventional and known per se) which prevents the button 14 from moving out of the handgrip 11 beyond the desired extent.

The holding or mounting portion 17 of the handgrip 11 is provided with a foot 26 which can be connected to the camera housing 10. In the embodiment of FIGS. 1 and 2 the foot 26 is rigid with the portion 17, for example of one piece with the same. The portion 16, on the other hand, is turnable relative to the portion 17 about the pivot axis 13, for which purpose the portion 17 is provided at its outer end with a radial flange 27 which extends into a central recess 28 formed in that side of the portion 16 which faces towards the portion 17. An annular member 29 surrounds the portion 17 and is secured to the portion 16 by means of screws or in any other suitable manner, retaining the flange 27 in the recess 28 and a preventing the disengagement of the portions 16 and 17 from one another while permitting turning of the portion 16 relative to the portion 17 about the pivot axis 13.

In the embodiment of FIG. 3, on the other hand, the portions 16 and 17 are rigid with one another, the portion 17 for example having a radial flange through which screws 30 extend which are secured to the portion 16. In this embodiment, however, the portion 17 is mounted in the foot 26 so as to be turnable relative to the same about the pivot axis 13. The manner in which the mounting is effected is clearly shown in FIG. 3 and requires no detailed explanation. An interior circlip (circumferentially incomplete spring ring) 31 provides further protection against relative axial displacement of the portion 17 and the foot 26. The portions 16 and 17 may also be of one piece with one another, if so desired.

In all embodiments the housing 10 of the camera has an opening 32 behind which the switch or other shutter release element 15 is located (see FIGS. 2 and 3). In the illustrated embodiments a plunger 33 is mounted in the opening 32 so as to be slidable axially of the opening, being biased outwardly of the opening by a spring 34 so as to remain in contact with the inner end of the pin 19 or to at least remain in close proximity thereto. However, it should be understood that the plunger 33 with its spring 34 could be omitted, if the coupling 20 is so arranged that the length of the displacement path of the pin 19 is large enough for the pin 19 to reach the movable contact of the switch 15 and to close the switch, when the button 14 is depressed. It is currently preferred to utilize the plunger 33 because this has the advantage that the switch 15 or similar shutter release element need not be freely accessible immediately behind the opening 32 (and is thus better protected) and furthermore that when the handgrip 11 is detached from the camera housing 10 the plunger 33 itself can be used as the actuator button for the camera. The spring 34 can be omitted if the movable contact of the switch 15 is sufficiently resilient to be able to urge the plunger 33 to the rest position illustrated in FIGS. 2 and 3 when the button 14 is released. The rest position of plunger 33 is determined either by engagement with the inner end of the pin 19, as indicated before, or else by suitable abutments which are not illustrated and may be provided on the plunger 33 and the housing 10, respectively.

A receiver 35 is mounted on the housing 10 of the camera in such a manner that when the foot 26 is inserted into it, the pin 19 is in registry with the opening 32 of the housing 10. In the embodiment of FIGS. 1 and 2 and in the embodiment of FIG. 3 the receiver 35 is a bracket 36 and the foot 26 is a shoe 37 which can be pushed onto the bracket. The bracket 36 is of two parts 38 and 39 which are arranged at opposite sides of the opening 32 and therefore at opposite sides of the path of movement of the pin 19, so as not to interfere with such movement. The receiver 36 may be partly recessed into the housing 10 of the camera, so that the shoe 37, when it is pushed onto the receiver, will be flush with the surface of the housing 10.

Figure 4:
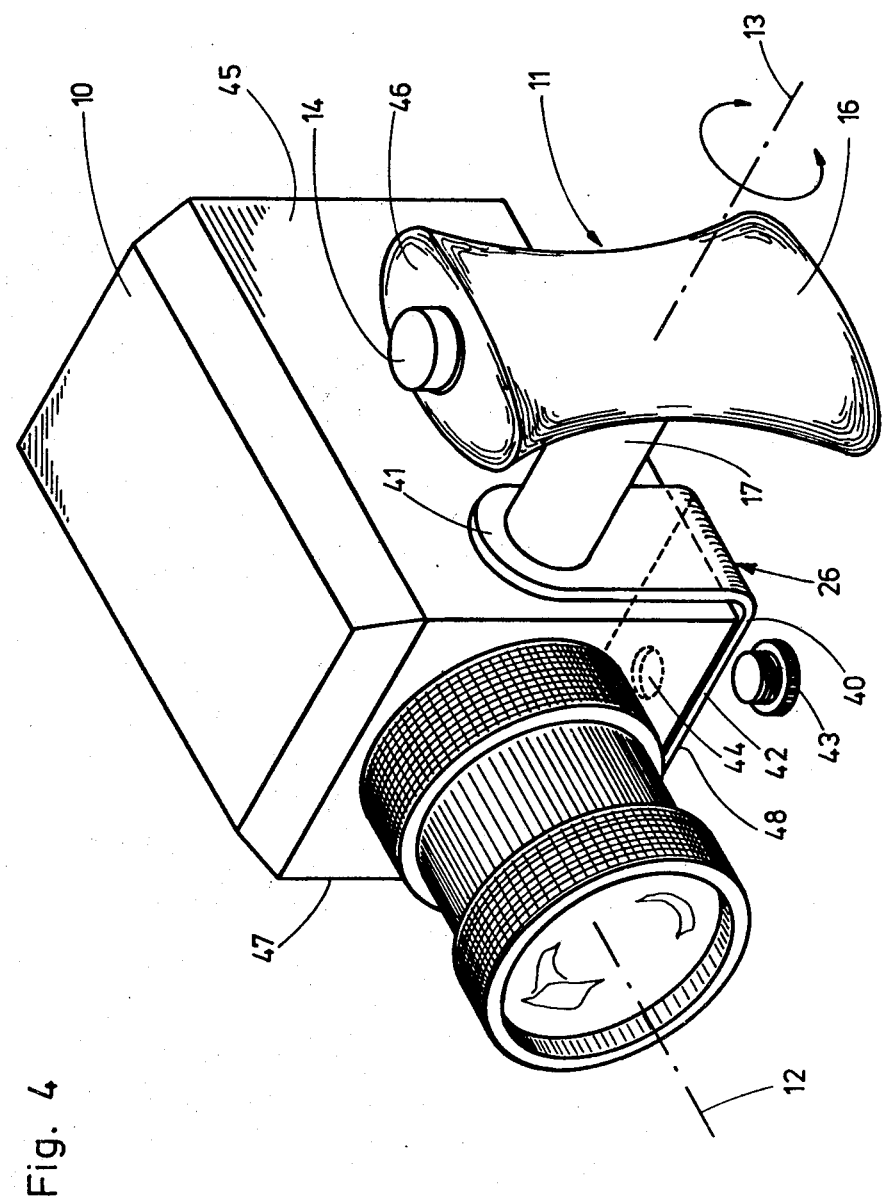
FIG. 4 is a view similar to the one shown in FIG. 1 but illustrating yet an additional embodiment of the invention.

In the embodiment of FIG. 4, on the other hand, the receiver is configured as an angled bracket 40 having one leg 41 extending alongside one of the side walls 45 of the camera housing 10, whereas the other bracket leg 42 extends beneath the bottom wall of the camera housing 10 and is provided with means for securing the bracket 40 to the housing 10. These means may be in form of a hole in the leg 42, which receives a threaded portion of a knurled screw 43 which can be turned through the hole into a tapped bore 44 in the bottom wall of the housing 10, such tapped bore 44 usually being anyhow provided for securing the camera on a tripod.

In all three embodiments of FIGS. 1-4 the pivot axis 13 of the handgrip 11 extends at right angles or substantially at right angles to the plane of one of the side walls, e.g. the side wall 45 of the housing 10. The handgrip 11 is always substantially of T-shaped configuration with the parts 16 and 17 forming the upright and the crossbar of the T. The trigger button 14 is inset into one of the end faces of the part 16 and is operated by one of the fingers of a user, usually the thumb which is appropriately located for this purpose when the handgrip 11 is held by one hand. The opening 32 in the housing 10 is provided in the side wall 45 and it is advantageous, although not absolutely necessary, that a corresponding opening (not shown) is located in the opposite side wall with a shutter release element 15 corresponding to the one described and shown herein, being located behind this second opening and also being connected to the shutter. In this case the handgrip 11 can be secured either to the right-hand or the left-hand side of the housing 10, so that the camera can be held and operated with equal facility either by the right hand or the left hand of a user.

In the embodiments of FIGS. 1-2 and 3 two receivers are provided (only one shown), one on the side wall 45 and one on the opposite side wall of the housing 10, so that the handgrip 11 can be secured to either of these side walls. The other side wall is identified with reference numeral 47 in FIG. 1. In the embodiment of FIG. 4, which utilizes the angle bracket 40, a receiver on the side wall 45 is not required. Of course, the opening 32 in the side wall 45 (and, if desired, a corresponding opening in the side wall 47) must be provided in the same manner as described before. Only a single angle bracket 40 is needed, since it can be secured to the housing 10 in such a way that its arm 41 extends either along the side wall 45 or along the side wall 47, the arm 42 being in each instance secured to the bottom wall by means of the screw 43 or some analogous means. The part 17 of the handgrip 11 may simply be threaded into a tapped opening of the arm 41 which, when the bracket 40 is secured on the housing 10, will register with the opening 32 or with its counter part in the side wall 47. Of course, in that case the portion 16 must be turnable relative to the portion 17. The portion 17 can, however, also be turnably secured in an opening of the arm 41 so that the portions 16 and 17 can turn together.

While the invention has been illustrated and described as embodied in a still camera, it is not intended to be limited to the details shown, since various modifications and structural changes may be made without departing in any way from the spirit of the present invention. It will be appreciated that appropriate (known per se) arresting means may be provided to prevent undesired and uncontrolled movements of the housing 10 and handgrip 11 relative to one another.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic camera, particularly a still camera, comprising a housing provided with a lens having an optical axis; a shutter release element in said housing; a handgrip mounted on said housing turnable about a pivot axis transverse to said optical axis and including one part extending along said pivot axis and another part extending in a direction transverse to said pivot axis; a trigger button mounted in said other part for sliding movement in said direction; and means for coupling said trigger button with said shutter release element to actuate the latter in response to said sliding movement of the former, comprising a first pin slidable in said one part lengthwise of said pivot axis from a rest position to an operating position in which it operates said shutter release element, a second pin slidable in said other part together with said button in said direction from a starting position towards and away from said first pin, and cooperating portions on said pins engageable with one another in response to sliding of said second pin towards said first pin and operative for imparting to said first pin upon such engagement a sliding movement to said operating position.

2. A photographic camera as defined in claim 1; and further comprising means for detachably connecting said handgrip to said housing.

3. A photographic camera as defined in claim 1, said trigger button being integrated with and non-detachably connected to, said handgrip.

4. A photographic camera as defined in claim 1, one of said cooperating portions being a contact surface on an end of one of said pins which faces towards a corresponding end of the other of said pins.

5. A photographic camera as defined in claim 4, said contact surface being a conical surface having an axis which is aligned with said pivot axis.

6. A photographic camera as defined in claim 5, wherein said conical surface is provided on said first pin.

7. A photographic camera as defined in claim 6, wherein the other of said cooperating portions is an inclined cam face on said second pin.

8. A photographic camera as defined in claim 4, said contact surface being the inner boundary surface of a conical recess in said second pin.

9. A photographic camera as defined in claim 1; and further comprising biasing means biasing said first pin towards said rest position and said second pin towards said starting position thereof.

10. A photographic camera as defined in claim 9, wherein said biasing means comprises a pair of biasing springs each biasing one of said pins.

11. A photographic camera as defined in claim 1, wherein said second pin is of one piece with said trigger button.

12. A photographic camera as defined in claim 1, wherein said other part is turnable about said pivot axis relative to said one part and said housing.

13. A photographic camera as defined in claim 1, said one part including a foot detachably connectable with said housing.

14. A photographic camera as defined in claim 13, wherein said foot is rigid with said one part.

15. A photographic camera as defined in claim 13, wherein said foot is turnable relative to said one part about said pivot axis, said one part and said other part being rigid and non-turnable relative to one another.

16. A photographic camera as defined in claim 15, wherein said first and second part are of one piece with one another.

17. A photographic camera as defined in claim 1, said housing having an opening aligned with the path of movement of said one pin to said operating position, and said shutter release element being located behind said opening and in said path of movement.

18. A photographic camera as defined in claim 1, said housing having an opening and said shutter release element being located behind said opening; and further comprising means for detachably connecting said handgrip with said housing so as to align said first pin with said opening.

19. A photographic camera as defined in claim 17; and further comprising an operating plunger interposed between said first pin and said shutter release element to operate the latter in response to movement of said first pin to said operating position thereof.

20. A photographic camera as defined in claim 1; and further comprising means for detachably connecting said handgrip to said housing, including a receiver on one of said housing and first portion, and a shoe on the other of said housing and first portion and being frictionally engageable with said receiver.

21. A photographic camera as defined in claim 20, said housing having an opening and said shutter release element being located behind said opening; and wherein said receiver is composed of two sections located at opposite sides of the path of movement of said first pin so that the latter can enter said opening by passing between said two sections.

22. A photographic camera as defined in claim 1, further comprising an angular bracket having one leg provided with means for engaging said one part, and another leg provided with means for securing said bracket to said housing.

23. A photographic camera as defined in claim 22, said securing means comprising at least one connecting member for connecting said other leg to a bottom wall of said housing.

24. A photographic camera as defined in claim 1, said housing having a top wall, a bottom wall and side walls, and said pivot axis extending substantially normal to one of said side walls.

25. A photographic camera as defined in claim 1, said handgrip being substantially T-shaped with said one part and said other part extending normal to one another.

26. A photographic camera as defined in claim 25, said other part having two end faces, and said trigger button being mounted in one of said end faces.

27. A photographic camera as defined in claim 1, said shutter release element being an electric switch having a movable contact operable by said first pin.

* * * * *